US008607956B2

(12) United States Patent
Horniak

(10) Patent No.: US 8,607,956 B2
(45) Date of Patent: Dec. 17, 2013

(54) BOTTLE RECEIVING AND DETECTION APPARATUS AND METHOD THEREFORE

(75) Inventor: John Colin Horniak, Chalfont, PA (US)

(73) Assignee: Deltronic Labs, Inc.PA (US)

( * ) Notice: Subject to any disclaimer, the term of this patent is extended or adjusted under 35 U.S.C. 154(b) by 428 days.

(21) Appl. No.: 12/348,259

(22) Filed: Jan. 2, 2009

(65) Prior Publication Data

US 2009/0166149 A1 Jul. 2, 2009

Related U.S. Application Data

(60) Provisional application No. 61/018,658, filed on Jan. 2, 2008, provisional application No. 61/075,355, filed on Jun. 25, 2008.

(51) Int. Cl.
*B65G 47/56* (2006.01)
*G07F 7/00* (2006.01)

(52) U.S. Cl.
USPC .............................................. 193/13; 194/205

(58) Field of Classification Search
None
See application file for complete search history.

(56) References Cited

U.S. PATENT DOCUMENTS

| | | | | |
|---|---|---|---|---|
| 3,310,157 | A * | 3/1967 | Clark | 193/31 R |
| 4,027,833 | A * | 6/1977 | Bernard et al. | 406/74 |
| 5,082,099 | A * | 1/1992 | Abe | 194/338 |
| 8,360,272 | B2 | 1/2013 | Piersant et al. | |
| 8,448,772 | B2 | 5/2013 | Wind | |
| 2007/0012541 | A1 | 1/2007 | Boydston et al. | |
| 2008/0121492 | A1* | 5/2008 | Kreitz et al. | 194/205 |
| 2008/0308383 | A1* | 12/2008 | Boydston et al. | 194/205 |

* cited by examiner

*Primary Examiner* — Kavel Singh
(74) *Attorney, Agent, or Firm* — Fox Rothschild LLP

(57) ABSTRACT

A device and method for receiving and detecting a bottle. The device includes a chute, a bottle inlet for receiving the bottle into the chute, and a bottle outlet through which the bottle exits the chute. A stop member is disposed to engage the bottle within the chute, the stop member being biased to allow the bottle to pass in one direction, but to move into and grip the bottle if the bottle is moved in the other direction. Sensors detect the position of the bottle within the chute, and can indicate that the bottle was received within the device. A method for receiving and detecting the bottle is also provided.

20 Claims, 15 Drawing Sheets

BOTTLE RECEIVING AND DETECTION APPARATUS AND METHOD THEREFORE

CROSS REFERENCE TO RELATED APPLICATIONS

This application claims priority to U.S. provisional applications 61/018,658 filed Jan. 2, 2008 and 61/075,355 filed Jun. 25, 2008, both of which are hereby incorporated herein by reference.

FIELD OF THE INVENTION

The present invention relates to bottle collection and recycling, and more particularly to devices for sensing and securely storing returned bottles and other similar items.

BACKGROUND OF THE INVENTION

It is known to recycle items such as glass and plastic bottles. This helps conserve resources and energy. While the return of empty bottles was previously a mostly manual process, more automated methods of receiving empty bottles have been developed.

One such device for receiving empty water bottles is disclosed in U.S. Patent Publication US2007/0012541 A1 which is incorporated herein by reference. The device and method disclosed in the publication provides for a bottle collection bin that receives and securely stores numerous empty bottles until such time as the bin is emptied. The bin includes a receiving chute through which the bottles are moved from the exterior into the interior of the bin where the bottles are stored. The bin can include means for detecting the intake of a bottle, such as a sensor, and means for indicating that a bottle was received, such as by dispensing a receipt (e.g. ticket), as proof that a bottle was returned. The receipt, for example, could be used to obtain a discount for the purchase of another full water bottle, or for the return of a deposit on the bottle.

In one known device, the means for sensing the return of the bottle is provided by an optical sensor placed near an outlet of the bottle receiving chute. The chute has an inlet through which the bottle is placed into the bin, and an outlet through which the bottle falls into the locked bin cage from where it can be removed only by an authorized person. As a bottle is pushed through the inlet of the bottle receiving chute towards the outlet, the bottle eventually exits from the outlet and falls into the cage, passing by the optical sensor that detects the bottle. Placement of the sensor near the outlet of the chute allows the sensor to detect bottles that have exited the chute and are falling into the cage. Since many such bins may be placed in areas that are not monitored, it is important to provide adequate security and sensing means so that only one receipt is dispensed for each empty bottle, regardless of attempts by users to fool the device into issuing additional receipts. Nevertheless, one concern with presently known systems is that users can tamper with the device by moving a bottle or other item through the chute and, rather then releasing the item, move the item back and forth across the sensor to obtain unauthorized tickets or receipts. Another major concern is the possibility of false sensor detections. For example, it has been found that lightning, birds flying near the sensor, or even objects blown by the wind past the sensors can trigger false detection signals. Accordingly, an improved bottle receiving device that can securely receive bottles and which is less prone to tampering and false signals would be advantageous.

SUMMARY OF THE INVENTION

The invention provides an improved bottle receiving device. In one form the invention provides an apparatus having a chute configured for receiving the bottle therein. The chute has a bottle inlet for receiving the bottle and a bottle outlet through which the bottle exits the chute. A stop having a stop member is disposed within the chute and biased towards the bottle to allow the stop member to engage the bottle as the bottle moves past the stop member. The stop member is configured to be urged by the bottle in a direction away from the bottle as the bottle moves from the inlet to the outlet thereby allowing said bottle to pass. On the other hand, should the bottle be moved in a direction from the outlet towards the inlet, such as if someone where to tamper with the device, the configuration of the stop member provides that the movement of the bottle will pull the stop member in a direction towards the bottle to more forcibly engage and thereby inhibit movement of the bottle. Also provided is a sensor for detecting when the bottle is at a first position within the chute, which sensor is in communication with an indicator for indicating the receipt of a bottle.

In another form, the invention provides an apparatus having a chute configured for receiving the bottle therein, the chute having a bottle inlet for receiving the bottle and a bottle outlet through which the bottle exits the chute. A first sensor is disposed to detect the bottle at a first position within the chute; a second sensor is disposed to detect the bottle at a second position within the chute which second position is spaced longitudinally from the first position between the chute inlet and the outlet so as to detect a different position of the bottle within the chute. A receipt dispenser in data communication with the first and second sensors is provided for issuing a receipt based on the data received.

The invention also provides an method for receiving and detecting a bottle. In broad terms, the method provides a chute configured for receiving the bottle therein, the chute having a bottle inlet for receiving the bottle and a bottle outlet through which the bottle exits the chute. A first sensor is disposed to detect the bottle at a first position within said chute; a second sensor is disposed to detect the bottle at a second position within the chute. A receipt dispenser in communication with the first and second sensors for is provided for issuing a receipt based on the data received.

BRIEF DESCRIPTION OF THE DRAWINGS

The following detailed description will be better understood when read in conjunction with the figures appended hereto. For the purpose of illustrating the invention, there is shown in the drawings a preferred embodiment. It is understood, however, that this invention is not limited to this embodiment or the precise arrangements shown.

FIG. 8 shows an empty water bottle in the inlet opening;

FIG. 9 shows the empty water bottle moved sufficiently into the inlet opening to engage the first bottle stop;

FIG. 10 is top view similar to FIG. 9;

FIG. 11 is an enlarged view showing the empty water bottle which has moved sufficiently into the inlet opening to engage the first bottle stop, similar to FIG. 9;

FIG. 12 is a top view of the bottle return/collection chute assembly showing the bottle which has moved sufficiently to engage the second bottle stop;

FIG. 13 shows the empty water bottle which has moved towards the outlet opening to engage and move the flap and thereby operate the mechanical sensor; and FIG. 14 shows the empty bottle exiting the apparatus of FIG. 1A.

DESCRIPTION OF A PREFERRED EMBODIMENT

Figure 1:
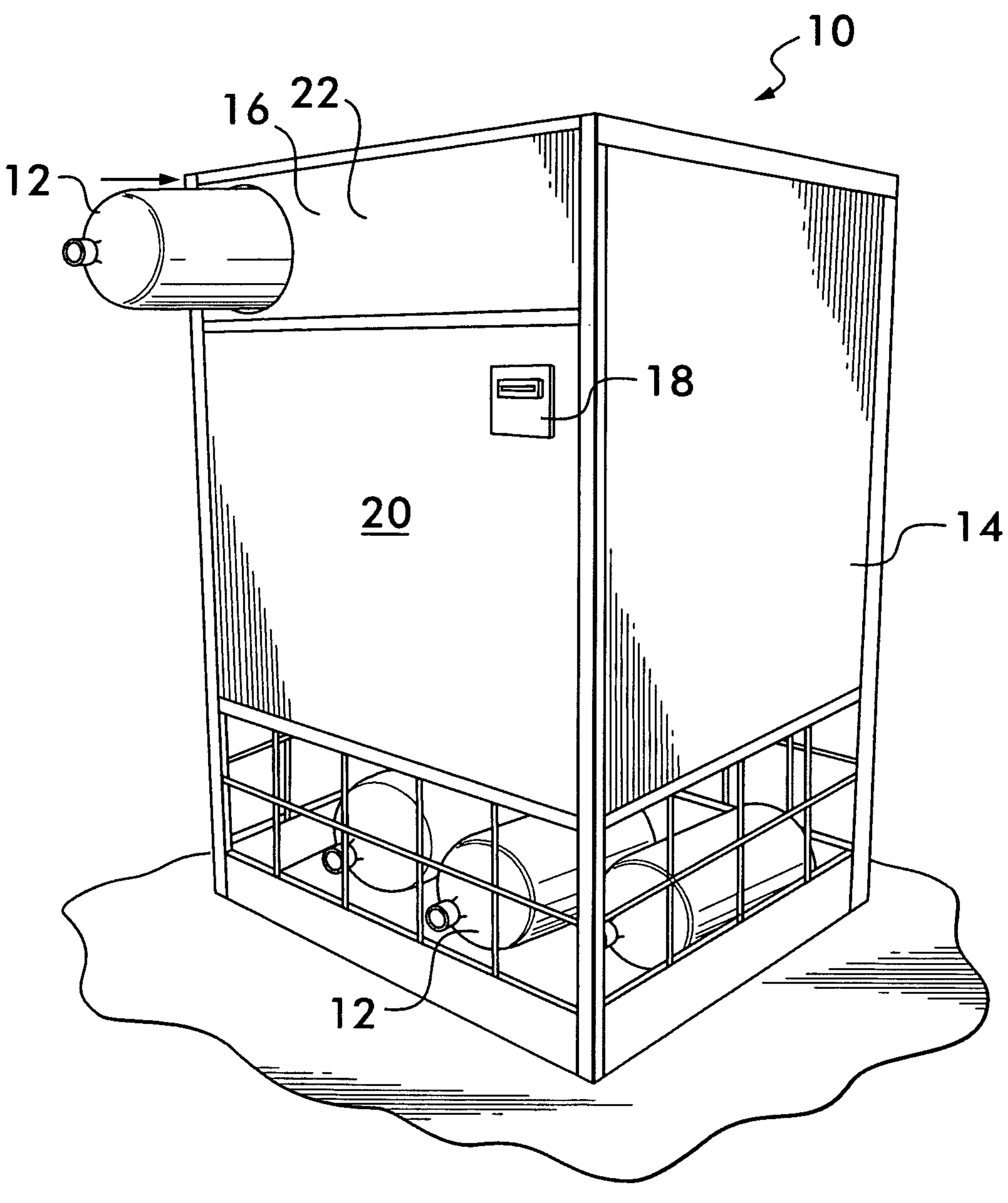
FIG. 1 is a perspective view of a bottle collection device in accordance with the present intention.

The present invention will now be described with reference to the drawings which illustrate a presently preferred embodiment of the invention. With reference to FIG. 1, a bottle collection device 10 can securely receive and hold returned bottles 12, such as plastic water bottles as shown. The device 10 preferably includes a bin or cage like structure 14 as shown which can be locked securely to prevent unauthorized removal of the bottles, and a bottle receiving apparatus 16 which receives and detects the bottles. In the illustrated embodiment, an indicator 18 provides evidence that a bottle was received. The indicator 18 can include devices that dispense receipts, e.g., tickets, as proof that a bottle was returned. Any type of bin or cage like structure which can securely hold the returned bottles can be used. The illustrated device 10 includes security bars and side panels as necessary to securely hold the bottles within. A lockable access panel 20 allows removal of the returned bottles and access to the interior as needed. The device 10 is preferably constructed of tamper resistant materials such as steel.

Figure 1A:
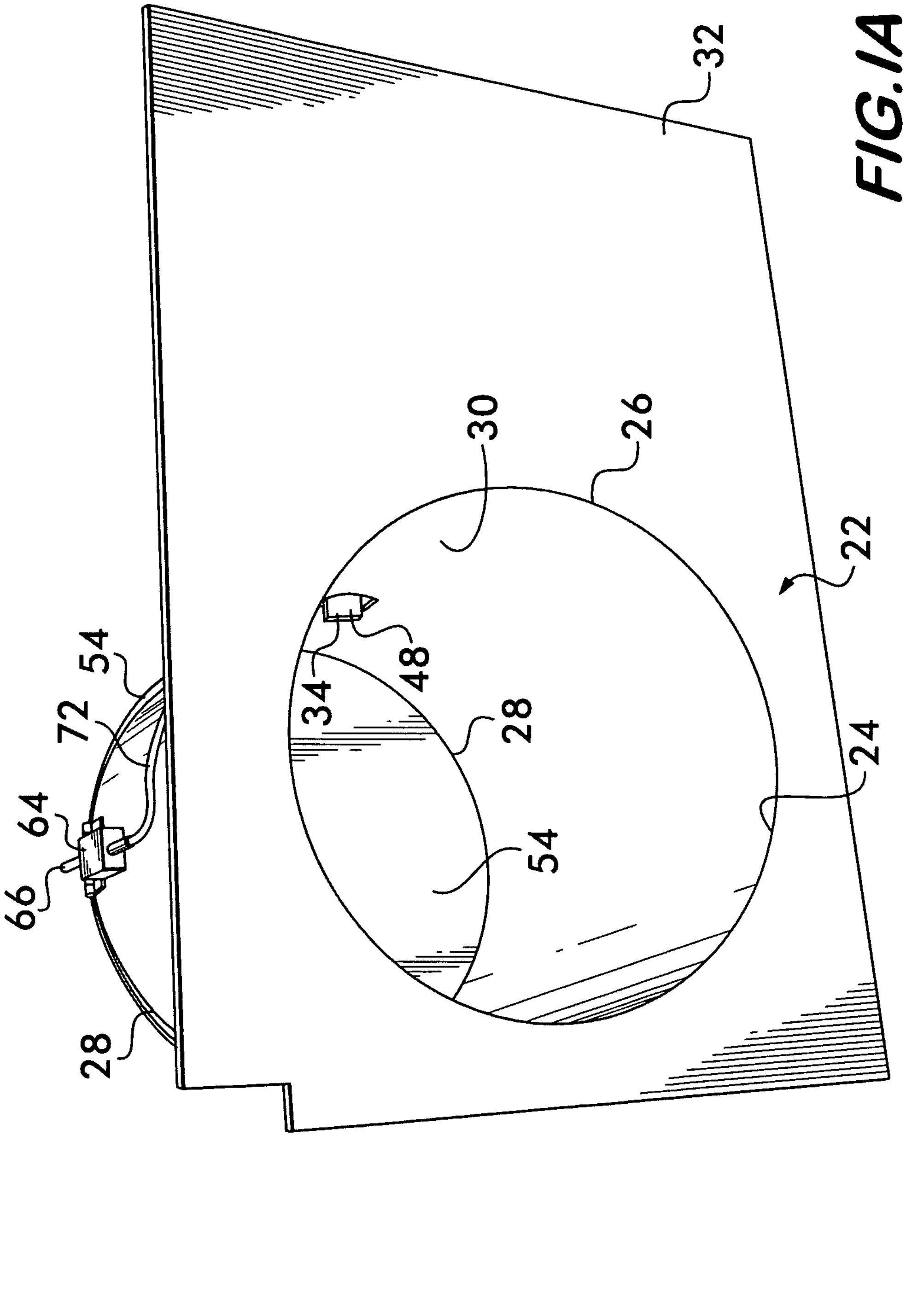
FIG. 1A is a front perspective view of a bottle return chute of a preferred embodiment of the present invention.
Figure 2:
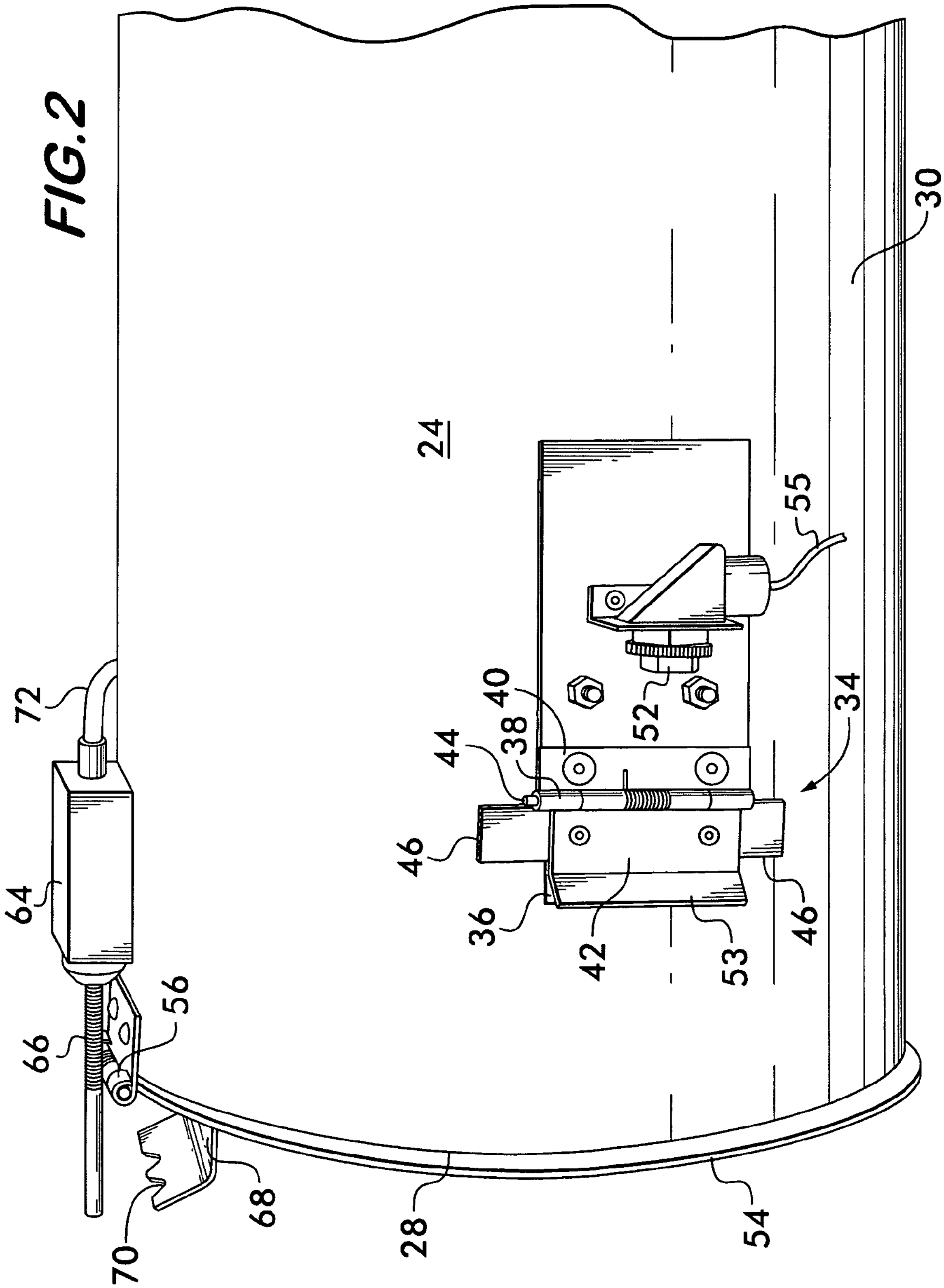
FIG. 2 is a side perspective view of the apparatus shown and oriented in FIG. 1A.
Figure 3:
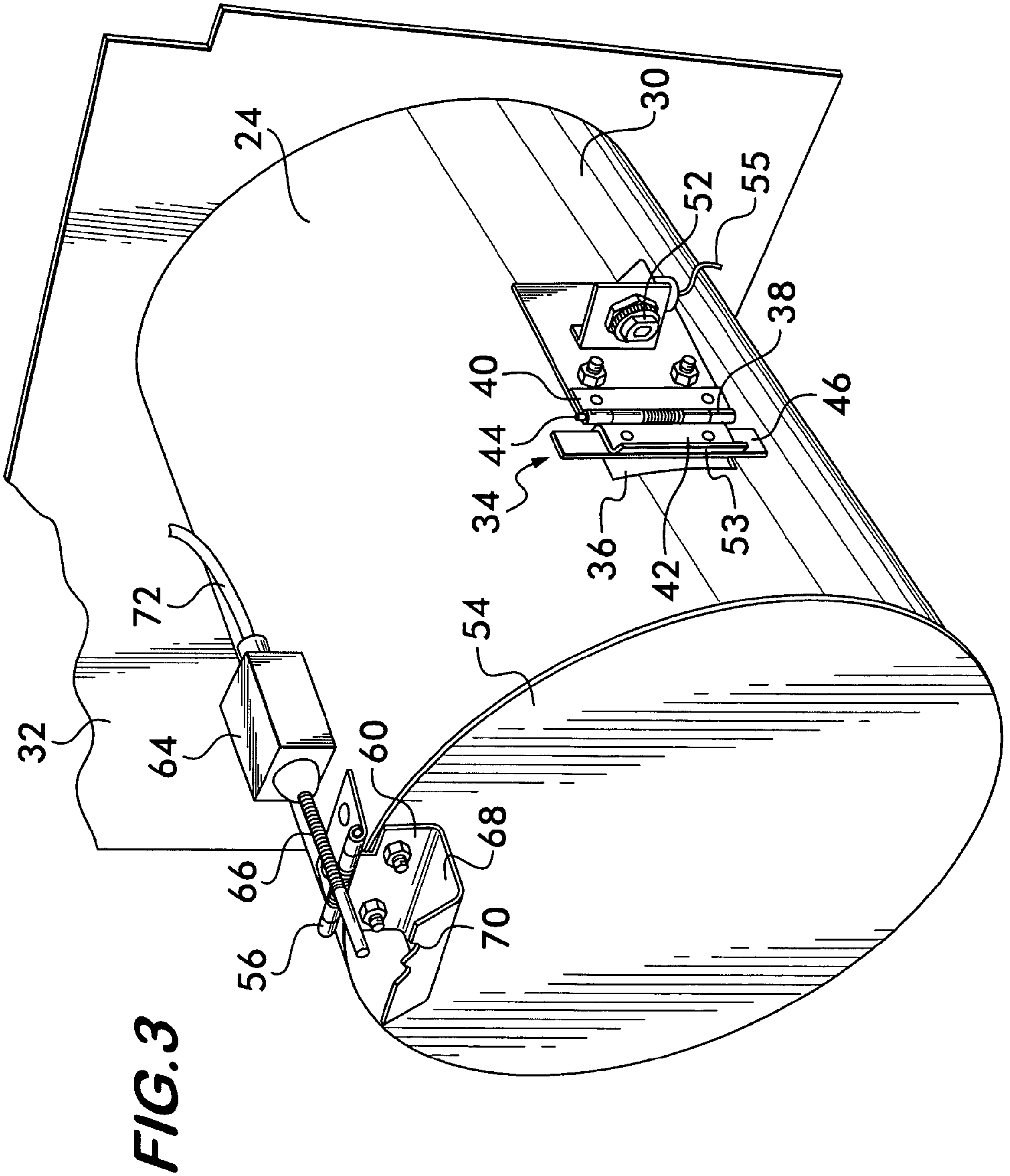
FIG. 3 is a rear side perspective view of the apparatus shown in FIG. 1A.

With reference to FIGS. 1A, 2 and 3, the illustrated bottle receiving apparatus 16 of the present invention is formed as a bottle return chute assembly 22 configured for use with 3 and 5 gallon plastic water bottles. The bottle return chute assembly 22 is shown removed from a top section of the collection device 10, it being understood that the return chute assembly 22 can be fabricated separately from the remainder of the collection device 10 and attached in a suitable manner such as by welding or with fasteners such as bolts, rivets, etc.. The bottle collection apparatus 10 receives the water bottles through the chute assembly 22, i.e., this apparatus allows a user to insert a water bottle through the chute assembly into the return apparatus 10.

The chute assembly 22 has as a cylindrical chute 24 which has a circular inlet opening 26, a circular outlet opening 28, and a cylindrical chute wall 30 extending between the inlet and outlet openings. With reference to FIG. 1, the bottle 12 is shown entering the inlet 26 while the outlet 28, not shown, is within the bin 14 so that the bottles can fall securely into the bin. It is appreciated that the chute 24 is sized and configured for the particular objects to be received therein. Nevertheless, it is contemplated that non cylindrical and non fully enclosed chutes may also be used, even for cylindrical bottles. A front flat panel 32 is connected to the inlet side of the chute 24. In the present case, the chute is sized and configured to receive 3 and 5 gallon cylindrical plastic water bottles as known in the art. An example of a 5 gallon water bottle 12 is shown in FIG. 1. For example, a bottle 12 having an outer diameter of approximately 10.75 inches is believed to be suitable with a chute 24 having an inner diameter of approximately 11.125 inches. This bottle can have a carrying handle as is known in the art, although some bottles do not have handles.

With particular reference to FIGS. 2, 3, 4 and 11, a bottle stop 34 is provided in an opening 36 (see FIG. 4) formed in the chute wall 30. The bottle stop 34 is pivotally attached to the chute wall 30 via a spring hinge 38. The hinge 38 includes a stationary section 40 fixedly attached via screws or rivets to the chute wall 30, and a pivotal section 42 that pivots relative to the stationary section 40 about the hinge pin 44. The spring is configured to urge the pivotal section 42 towards the internal portion of the chute (to engage a bottle 12 therein). Stop flaps 46 extend beyond the opening 36 to engage the wall 30 and thereby act as a stop of the movement of the pivotal section 42 into the chute 24. It is appreciated that the spring hinge 38 is configured to urge the pivotal section 42 of the hinge into the opening 36 towards the bottle within the chute 24.

Figure 11:
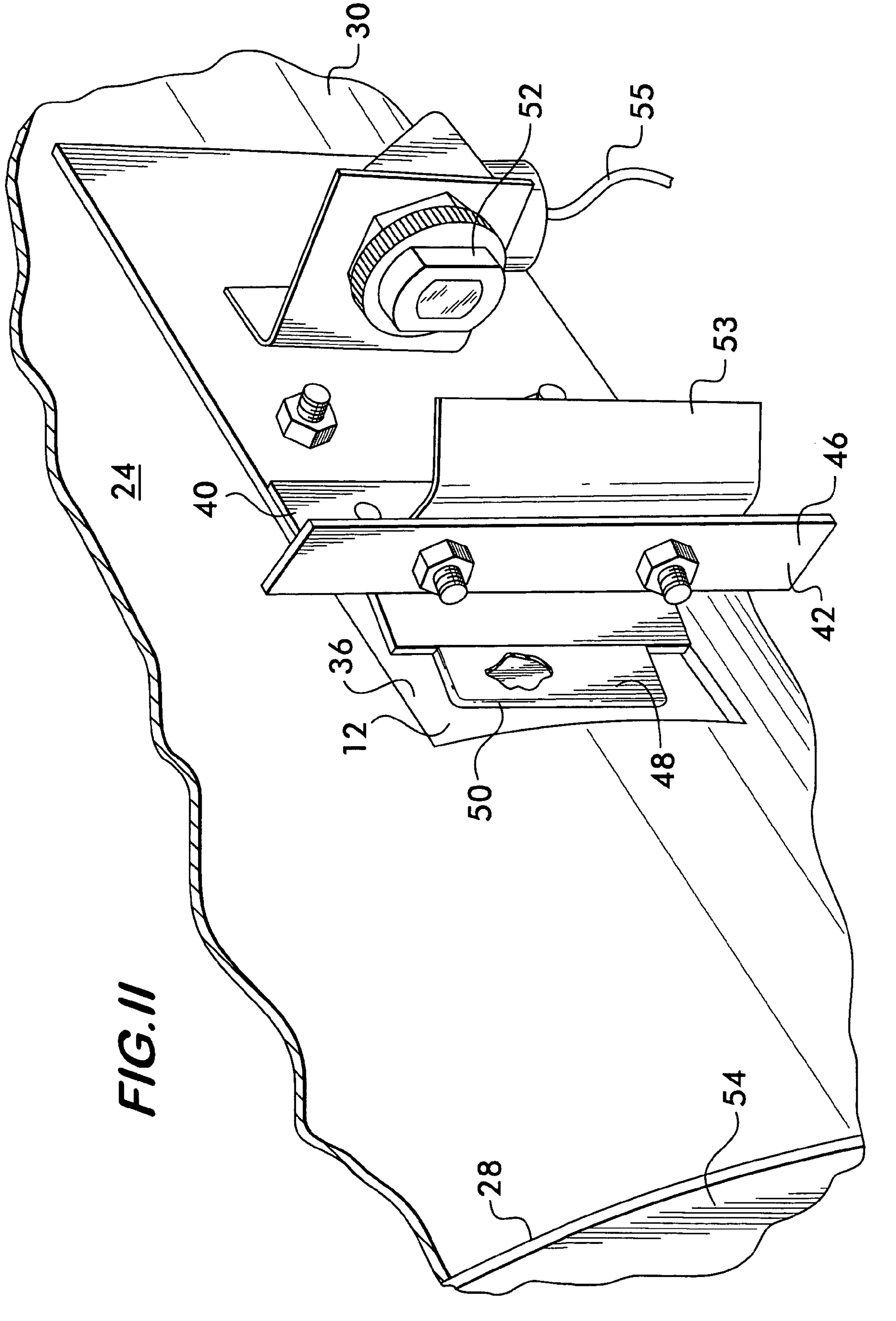

As best seen with reference to FIG. 11, the stop 34 has a stop member 48 attached to and extending from the pivotal hinge section 42 through the opening 36 into the cylindrical chute 24. The stop member 48 may include a rubber piece 50 or any other type of material that can grip the bottle, preferably with high friction. Again, with reference to FIG. 11, as a bottle moves through the chute 24 from right to left it is seen that the bottle engages the stop member 48, pushing the stop member 48 so that it pivots leftward (away from the chute inlet 26 and towards the outlet 28) against the urging of the spring of the hinge as the bottle slides past and against the stop member 48. Should the person inserting a bottle attempt to pull the bottle back out of the chute (in a rightward direction), the stop member 48 will pivot rightward to grippingly engage the bottle with the stop member 48 engaging one side of the bottle and the opposite side of the bottle being pushed by the stop member 48 against the inside wall of the chute 24 to prevent movement of the bottle 12. Thus it is seen that at this position the bottle can be “gripped” between the stop member 48 and the opposite side of the inner chute wall (as discussed below, as the bottle moves further down the chute, the bottle will be gripped between the stop member 48 and other members). Moreover, it is appreciated that the harder one pulls on the bottle in a rightward direction, the tighter the grip of the stop member 48 as the stop member 48 attempts to rotate back into the chute 24, more tightly clamping the bottle between the stop member 48 and inside wall of the chute 24, and thereby increase the grip on the bottle. Moving the bottle again to the left as oriented in FIG. 11, the stop 34 would again rotate leftward towards the outlet 28 of the chute to allow the bottle to pass. The stop 34 and associated members can be made of any suitable material, such as metal for strength. The stop member 48 can be a rubber or polymeric sleeve over a metal member.

Figure 4:
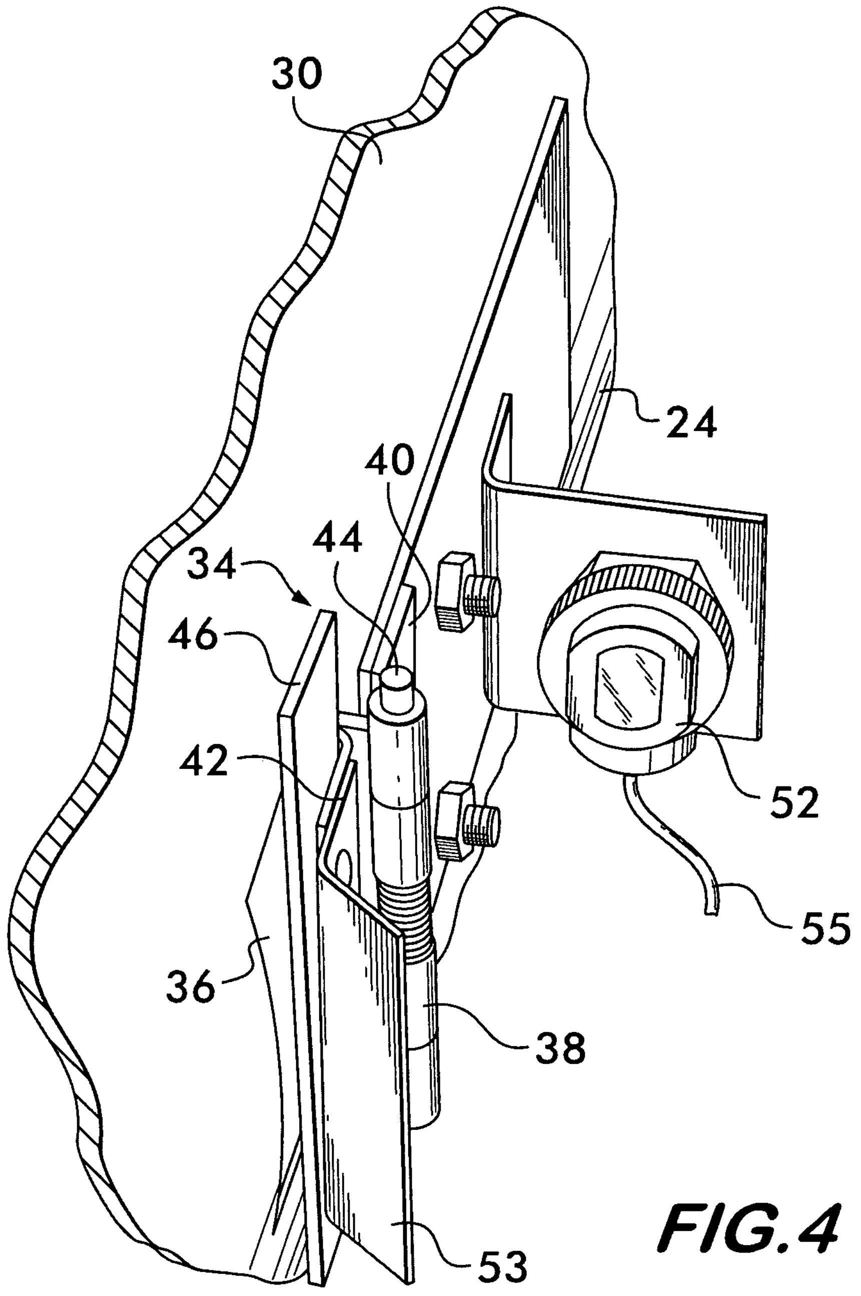
FIG. 4 is an enlarged view of the side shown in FIG. 2 showing an optical sensor and a bottle stop.

With reference to FIGS. 2 and 4, a sensor 52 is provided to sense the passing of the bottle at a particular position as further described below. In the illustrated embodiment, the sensor 52 takes the form of an optical sensor mounted to the chute wall 30 via a bracket adjacent to the spring hinge 38 and which is positioned to sense the movement of the stop member 48 attached to the pivotal section 42 of the hinge 38 as the bottle moves past and engages the stop member 48. As discussed above, the bottle stop 22 engages the bottle 12 as it moves past it such that the bottle stop moves outwardly away from the bottle. A deflector section 53 attached to and moving with the hinge member 26 interferes with the optical beam from the sensor 52 to indicate that the bottle has reached this particular position within the chute 24. Any suitable sensor can be used, e.g. mechanical and magnetic sensors. In the present embodiment, it is believed advantageous to combine the optical sensor with the stop so that movement of the stop member 48 is detected by the optical sensor. It is appreciated, however, that other configurations would allow the optical sensor to work independent of the stop. The sensor 52 is powered and communicates via cable 55 with other devices, such as the indicator 18 which can include a controller and/or a receipt (e.g., ticket) dispensing device. As further discussed below, the indicator communicates with various devices to receive data therefrom, and provides an indication that a bottle was received based on a predetermined sequence of events.

Figure 5:
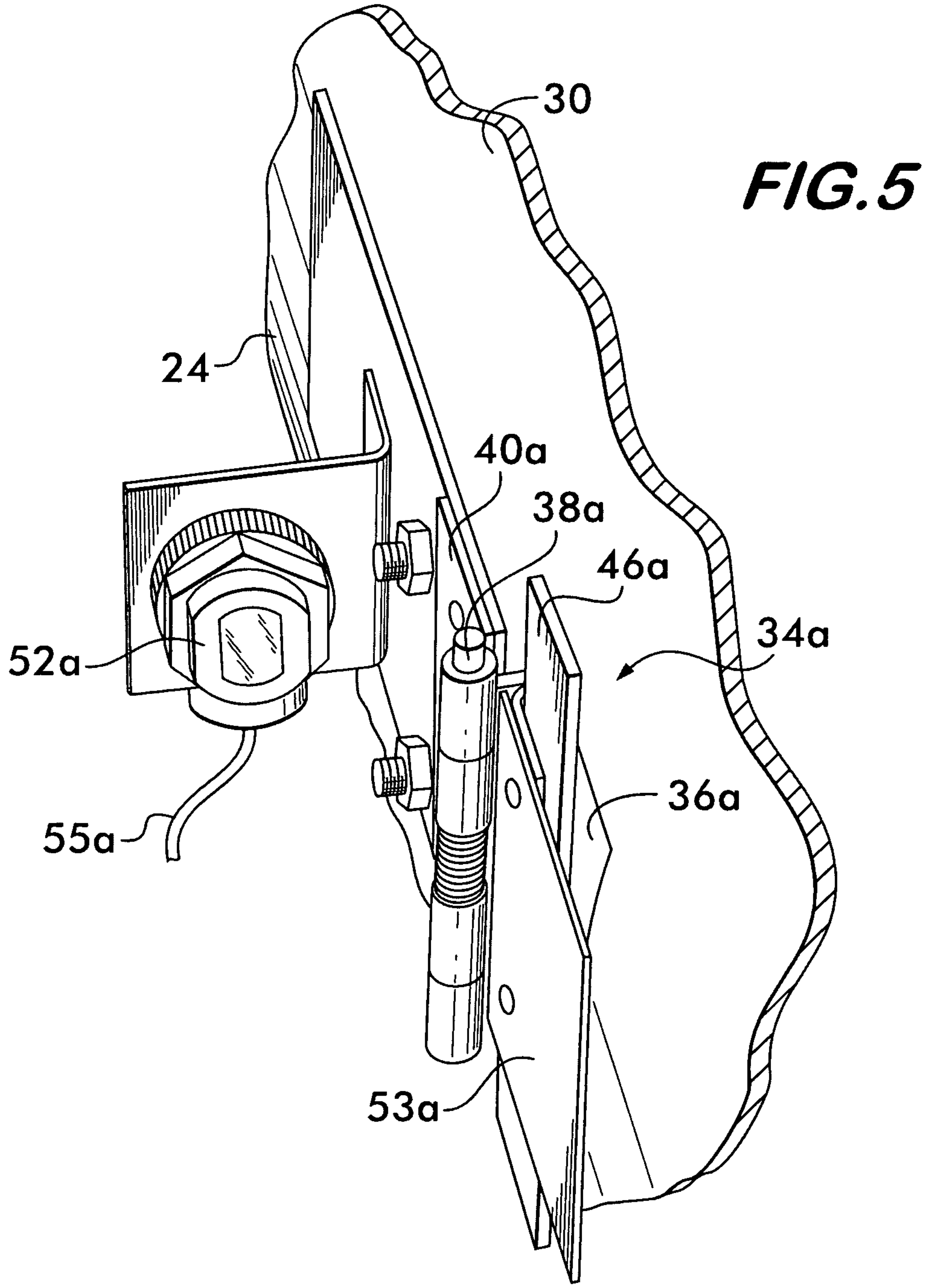
FIG. 5 is a large view of the side of the apparatus of FIG. 1A from the opposite side of that shown in FIG. 2 and which shows another optical sensor and another bottle stop.

With reference to FIG. 5, provided on the opposite side of the chute 24 is a second bottle stop 34*a* and a second sensor 52*a* which are identical to the first stop 34 and the first sensor 52 described above with the exception that the second stop 34*a* and second sensor 52*a* are spaced longitudinally from the first stop 34 and the first sensor 52, e.g., in the illustrated example the second stop 34*a* is positioned longitudinally further away from the inlet of the chute 24 than is the first stop 34 such that the second stop and second sensor would be operated by the bottle after the bottle travels further towards the outlet 28 or at a time after the operation of the first stop and first sensor. Elements of the second stop 34*a* and second sensor 52*a* similar to those of the first stop 34 and sensor 52 are indicated with the same reference numerals succeeded by the letter "a". In one preferred embodiment the second stop 34*a* is positioned about ⅝ of an inch further towards the outlet 28 relative to the first stop. Other distances may be suitable. The two stop members 34, 34*a* are placed preferably on opposite sides of the chute 24 so that the two stops can cooperate to provide sufficient stopping force on the bottle 12 should someone attempt to remove a bottle through the chute, although the first stop member alone, clamping the bottle between the stop member and the chute wall 30, is believed to be capable of effectively gripping the bottle. The two stops 34, 34*a* are about ⅝ of an inch from one another lengthwise between the opening 26 and outlet 28 of the chute 24 so that the sensors operate in a sequence i.e. the first sensor will sense the bottle 12 before the second sensor in a predetermined sequence. This has some advantageous features as further discussed below. Thus, in the preferred embodiment, it is seen that the first and second stop members 34, 34*a* are spaced from one another for the purpose of allowing the sensors to detect the bottle at different positions within the chute. In some configurations, such as where the stop members and sensors were configured to work independent from one another, it is contemplated that the first and second stop members would not need to be spaced longitudinally from one another while the first and second sensors would be spaced longitudinally from one another to provide the desired detection sequence.

Figure 6:
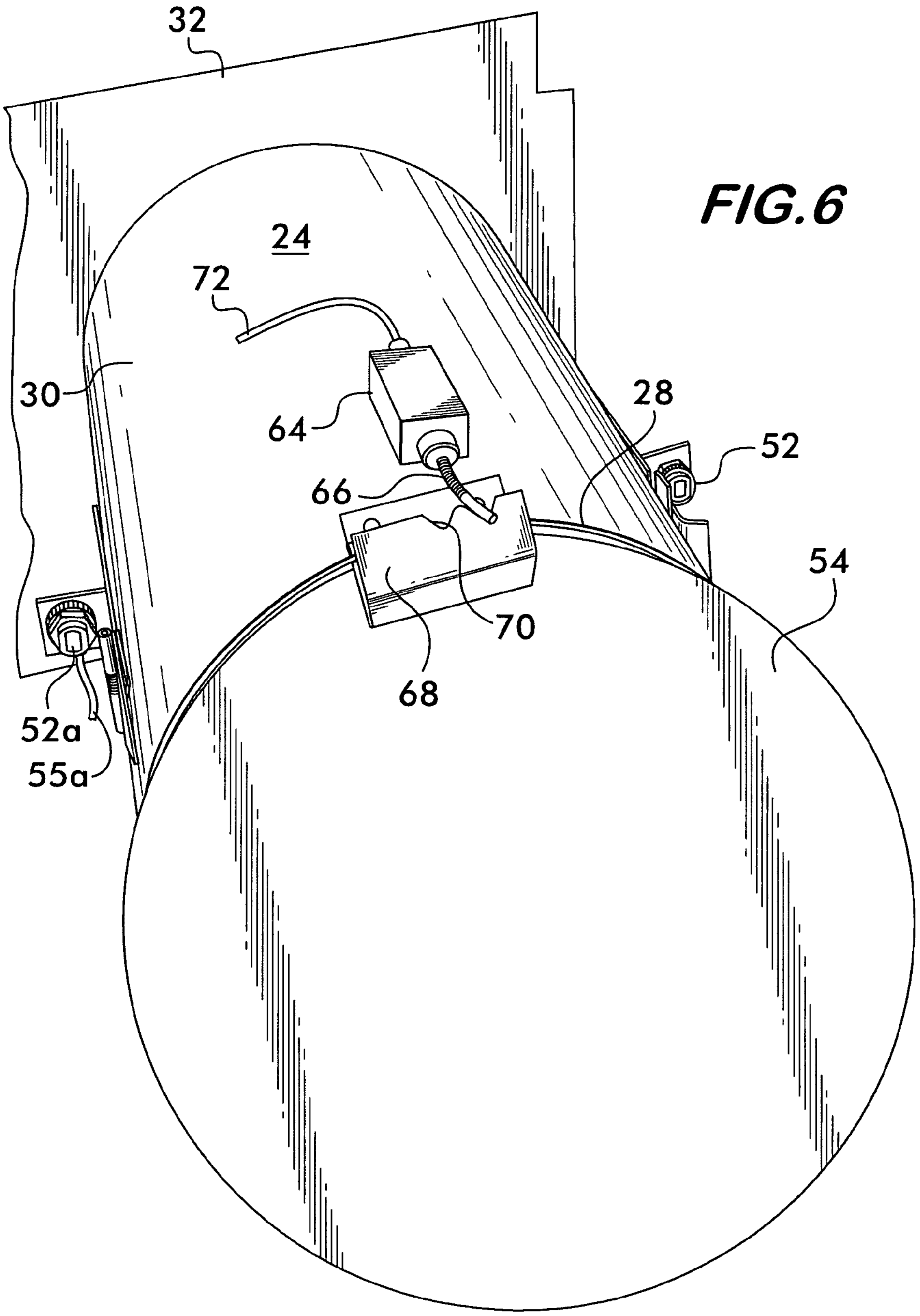
FIG. 6 is a rear perspective view of the apparatus of FIG. 1A showing a hinged flap and a mechanical sensor on top of the chute.
Figure 13:
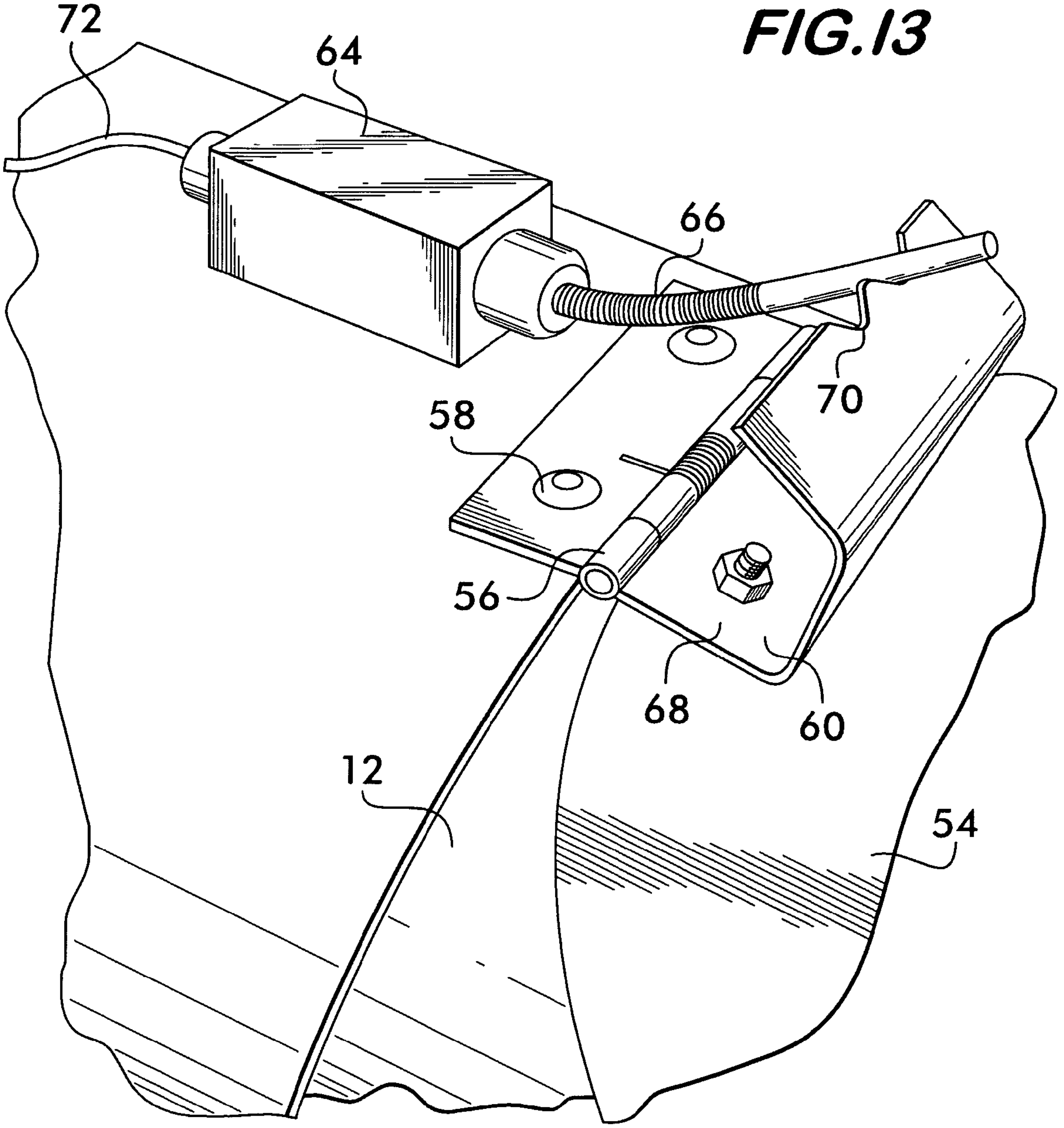
Figure 14:
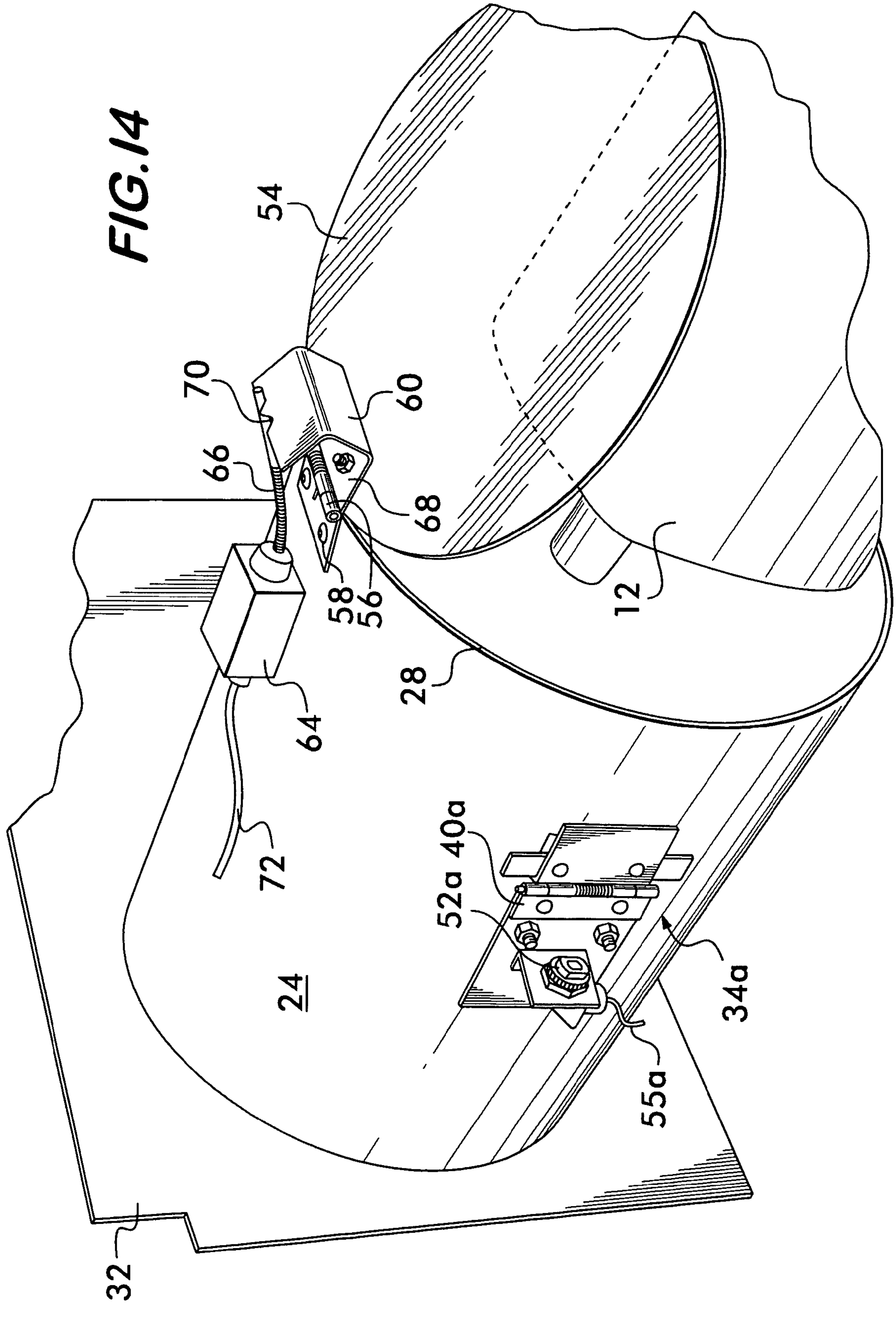

With reference to FIGS. 6, 13 and 14, a circular flap 54 positioned to cover the outlet opening 28 is pivotally attached to the top of the chute wall 30 via a hinge 56 having a stationary section 58 attached to the chute wall 30, and a moveable section 60 attached to the flap 54. The flap 54 opens by pivoting about the hinge 56, returning via a hinge spring 62 to a position covering the outlet opening 28. The flap 54 can be made of a plastics material, or any other suitable material.

Figure 7:
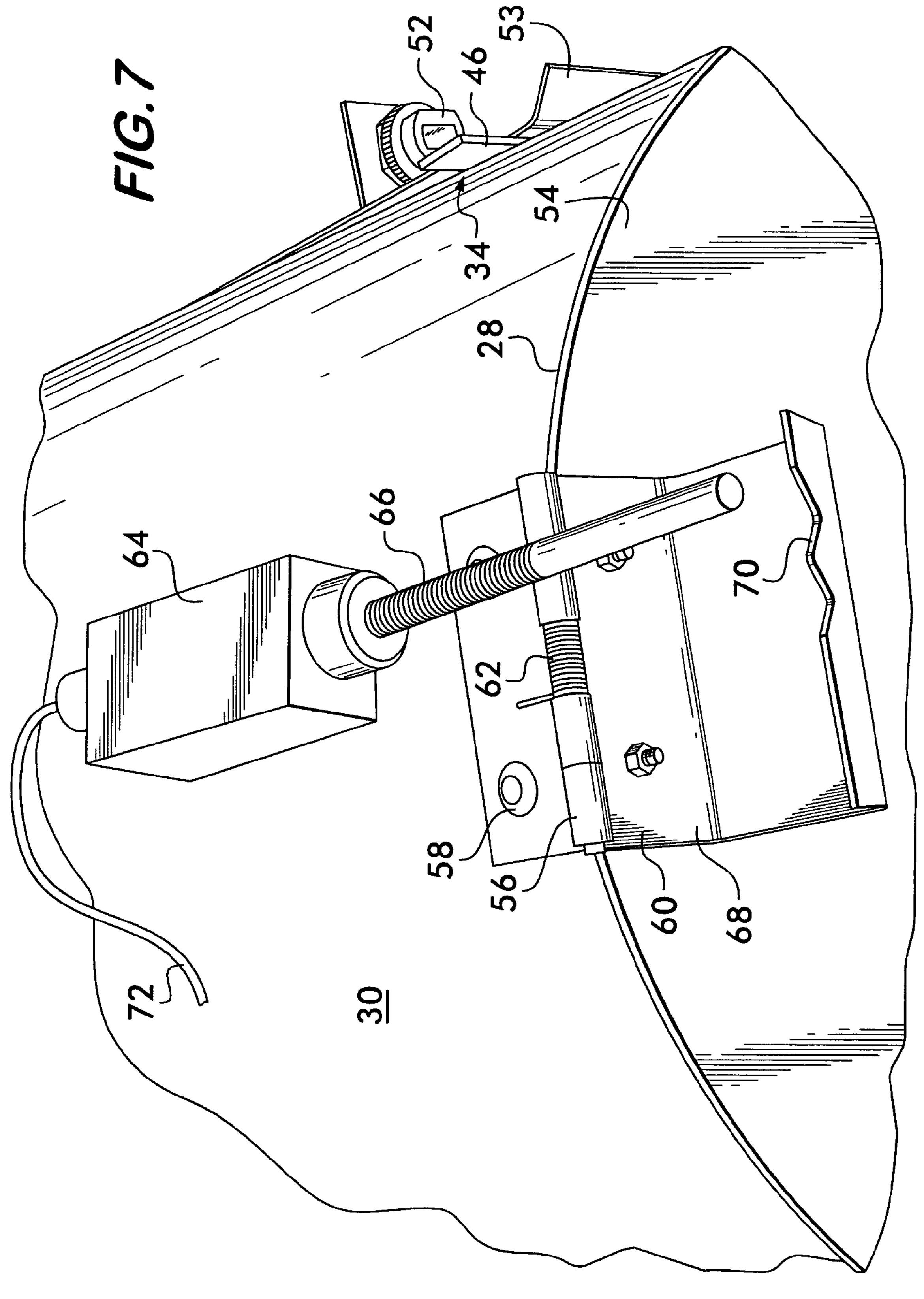
FIG. 7 is an enlarged view of the mechanical sensor and top portion of the flap shown in FIG. 6.

With reference to FIGS. 3, 6 and 7, a third sensor 64 is provided on the top of the chute 24 near the outlet 28 so as to detect a bottle 12 exiting the chute outlet 28. In the preferred embodiment, this third sensor 64 is a mechanical sensor having a displaceable contact arm 66 that is moveable from a rest first position (extending straight out as seen in FIG. 7) to a second position (displaced as seen in FIG. 13). This sensor 64, as known in the art, is capable of providing signals to indicate whether the arm 66 is in the first or second positions. Attached to the moveable section 60 of the hinge 56 is an extension member 68 having a v-shaped notch 70 that engages the tip of the arm 66 therein, configured to move the arm 66 between the first and second sensor positions as the flap moves respectively from a position closing the outlet opening 28 (FIG. 7) to a fully open position (FIG. 14) when the bottle is exiting the outlet opening 28. Although a mechanical sensor is illustrated, other forms of sensors can be used to detect movement of the bottle through the outlet 28. The hinge extension 68 can be made of any suitable material such as metal. The sensor 64 communicates with other devices such as the controller via cable 72.

The three sensors 52, 52*a*, and 64 communicate with a controller device (not shown) which can be used to perform various functions, such as controlling a ticket dispenser to dispense a ticket as proof that a bottle was received by the device 10. Any know devices can be used, such as a ticket dispenser provided by Deltronic Labs Inc., model number DL-4-SS. Any suitable controller can be used to read the signals and cause the dispensing of a ticket. In one preferred embodiment a Microchip P1C16C627A microprocessor is used. The controller receives the signals from the optical sensors 52, 52*a*, and mechanical sensor 64, and can be positioned within the dispenser or a separate controller as known in the art. For example, the controller can include a programmable chip programmed to actuate the dispenser when the sensors indicate bottle movement in the preprogrammed sequence as discussed below.

In the present embodiment, the three sensors are used in an advantageous manner to prevent false signals and to provide security against tampering to obtain a ticket without first returning a bottle. The three sensors 52, 52*a* and 64 must detect the bottle in a predetermined sequence or a ticket will not be dispensed. In the illustrated embodiment, the first sensor 52 must be activated first, followed by the second sensor 52*a*, followed by the third sensor 64. If this sequence takes place, then a ticket will be dispensed. Any other sequence or failure of any or all sensors to detect the bottle, and a ticket will not be dispensed. Additionally, it can be required that the sensor indications must be provided within a given time period or a ticket will not be dispensed. For example, if the third sensor 64 on the flap does not provide a bottle indication signal within a certain predetermined time period after a signal is received from the first or second sensors 52 and 52*a*, as would happen if someone were tampering with the device, the controller would not dispense a ticket even if the third sensor 64 were eventually to send a bottle indication signal. The system would simply reset and the entire proper sequence would have to be carried out for a ticket to dispense. Likewise, if the second sensor 52*a* does not detect the bottle 12 within a predetermined time period after the first sensor 52 detects the bottle, the system can be programmed to reset.

Another advantage is that false indications are prevented. For example, should light from lightening cause an optical sensor to provide a false indication of a bottle, both optical sensors (the first and second sensors 52 and 52*a* ) will likely do so at the same time, contrary to the sequence required to dispense a ticket. Moreover, without an indication from the third mechanical sensor 64 in the proper sequence, a ticket will not be dispensed. Likewise, should something move across the field of an optical sensor, such as a wind blown object, without indications from the other two sensors in the required sequence, a ticket will not be dispensed. Thus it is appreciated that someone trying to cheat the apparatus by moving their hand or other objects within the chute to create false signals from the sensors would find the task difficult if not impossible, particularly since they cannot see the sensors from outside of the apparatus 22, and more so if they do not know how the system works or the required sequence of sensor indications. Moreover, should someone try to cheat the apparatus by moving a bottle in and out of the chute 24, the bottle stops 22 and 22*a*, engaging opposite sides of the bottle, would prevent movement of the bottle back out from the inlet.

Figure 8:
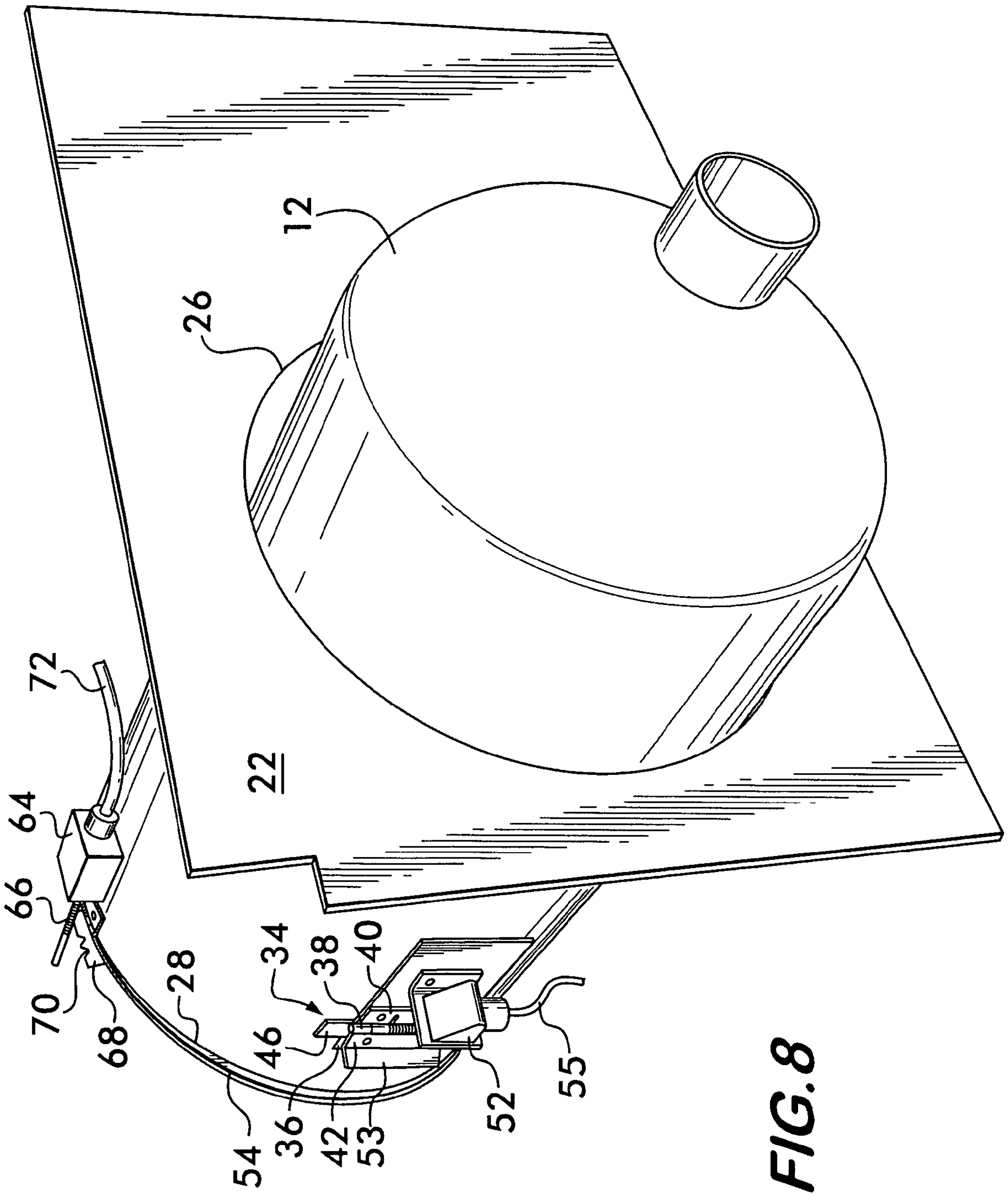
FIGS. 8 thru 14 illustrates the movement of an empty bottle through the apparatus of FIG. 1A as follows.
Figure 9:
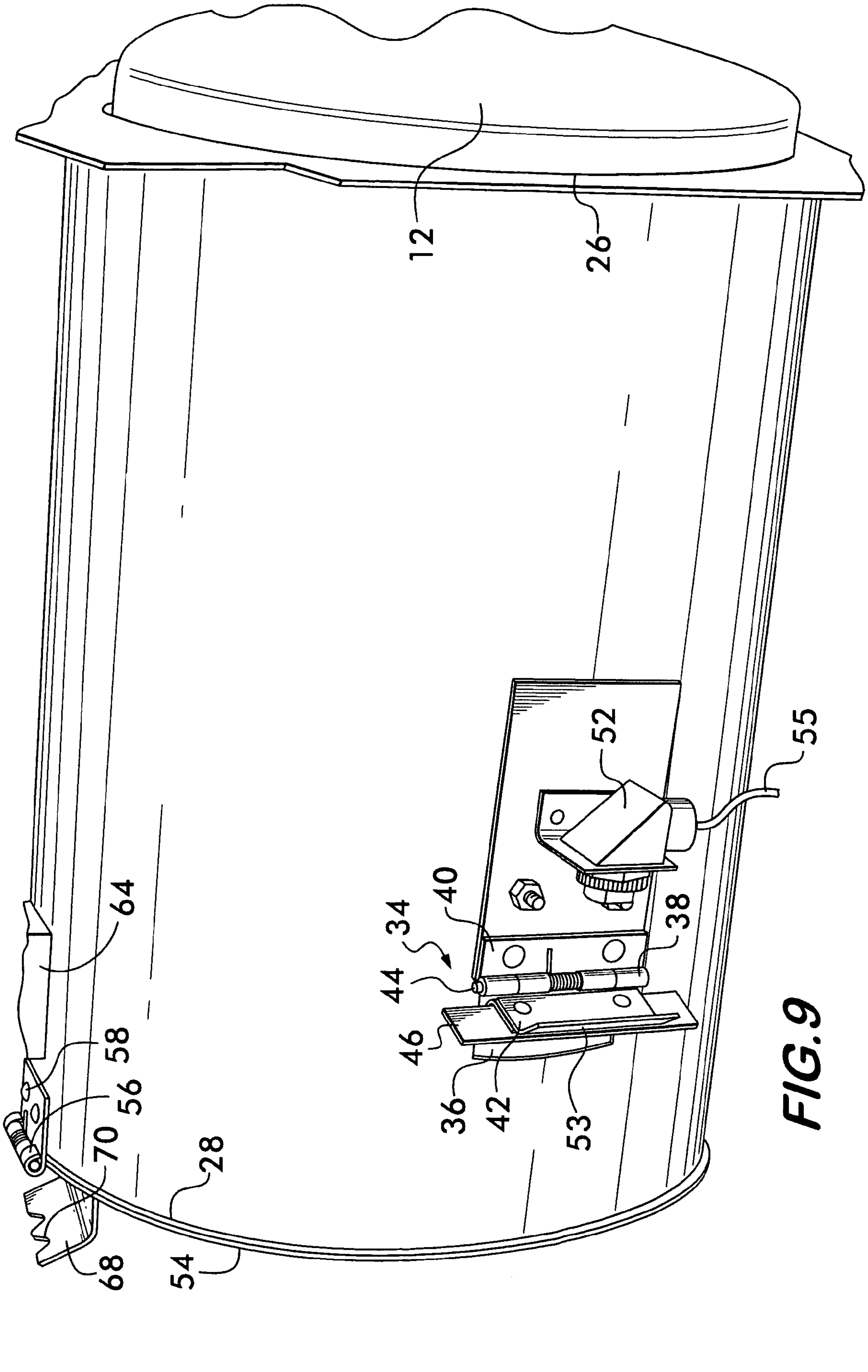
Figure 10:
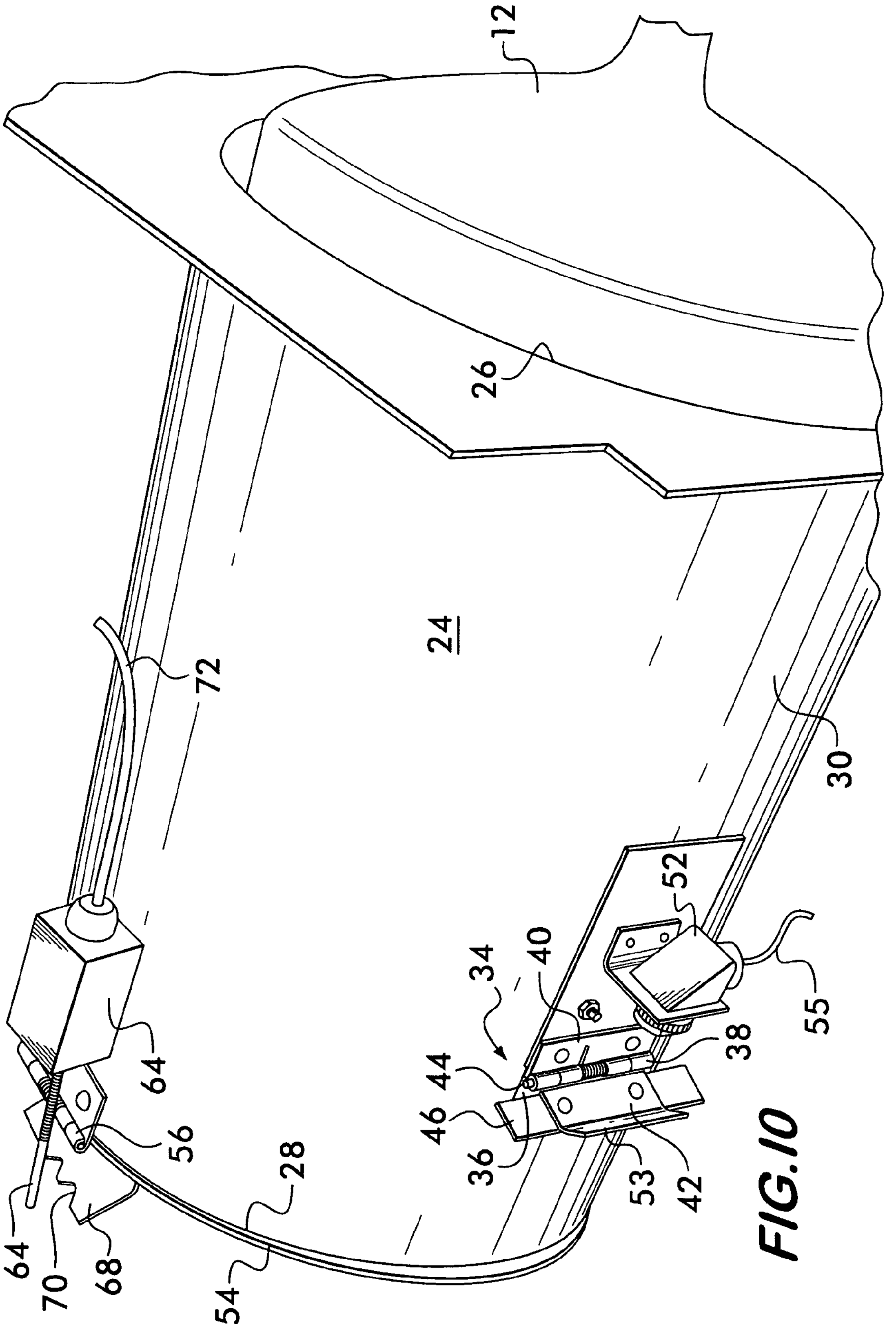

The use of the present invention is now illustrated with reference to FIGS. 8 through 14. As shown in FIG. 8, an empty water bottle 12 is inserted bottom first by the user into the inlet opening 26 of the chute 24. Then, as seen in FIGS. 9, 10, and 11, the bottle 12 is pushed towards the rear of the chute 24 where it will engage first the bottle stop 34 and optical sensor 52. The bottle will push the stop member 48 and thereby push the deflector 53 into the path of the optical sensor 52 such that the sensor 52 will send a signal to the controller indicating that the bottle has reached the first stop 34. As the bottle 12 continues to move, it engages the second stop 34*a* and causes the second optical sensor 52*a* to signal the controller that the bottle has reached the second stop 34*a*.

Figure 12:
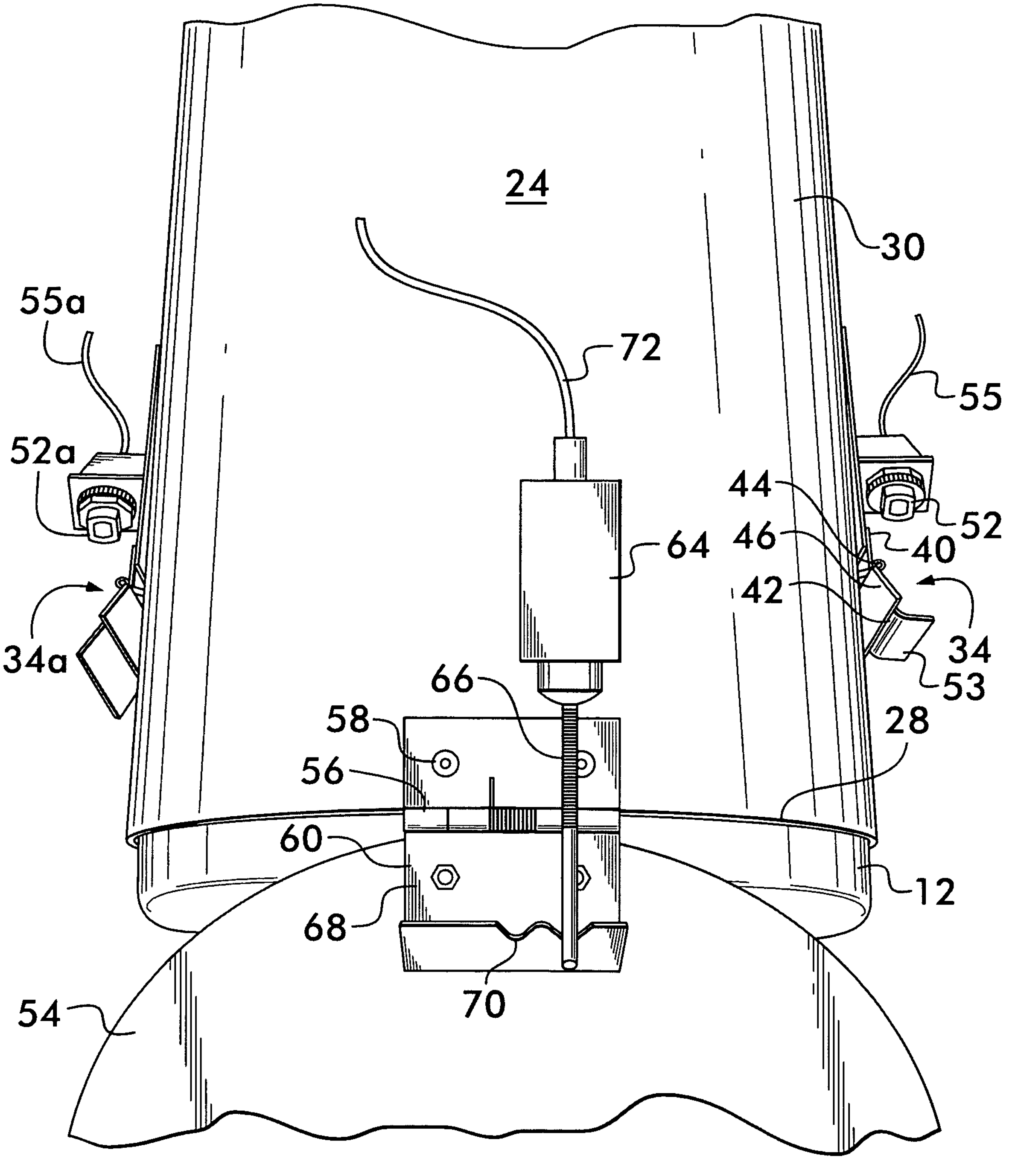

With reference to FIGS. 12, 13, and 14, it is seen that the bottle 12 is ultimately pushed out of the chute 24 through the outlet 28. This causes the flap 54 to move upwardly thereby causing the sensor arm 66 to move so as to signal the controller that the bottled 12 has reached this position. The bottle 12 then falls from the opening 28 into a holding bin where the containers are securely stored (see e.g., FIG. 1). As long as the controller receives the sensor signals in the predetermined order and timing, it will operate the ticket dispenser 14 to release a ticket or whatever else is to be dispensed.

Another preferred sequence of events is now described. In this embodiment the unit is disabled for about 1 second after the dispensing of a ticket for a returned bottle. A customer places the next bottle 12 into the inlet opening 26 of the chute 24 bottom first and pushes the bottle towards the outlet 28.

(a) As the bottle moves, first the bottle stop 34 is engaged and the first sensor 52 detects the bottle.

(b) Next the bottle will engage the second stop 34*a* and the second sensor 52*a* detects the bottle, at which event the first sensor 52 must still detect the bottle, and the unit must be enabled (see above—the unit is disabled for about 1 second after a ticket is released). If all these conditions are true then a flag is set to indicate this for step (c). This flag is reset after a ticket is dispensed.

(c) Next the third sensor 64 detects the bottle, and the unit must be enabled and the flag set in step (b) must still be set.

(d) After pushing the bottle through the outlet 28, the third sensor 64 stops detecting the bottle, indicating that the bottle has passed the third sensor 64. When this occurs, a timer for about 255 ms is started.

(e)(1) If the first and second sensors 52 and 52*a* detect a bottle before the timer of step (d) times out, then the timer is reset and no ticket is dispensed. The sequencing checker subroutine goes back to step (c).

(e)(2) If the timer that is set in step (d) times out without the first and second sensors 52 and 52*a* detecting a bottle, then a ticket is dispensed. Explanation of step (e) is as follows: The bottle construction is such that when the bottle starts its travel through the chute, the first two sensor switches for sensors 52 and 52*a* will close and stay closed in sequence (a closed sensor meaning a sensor that detects the bottle; an open sensor meaning that the sensor does not detect the bottle). After that, the first and second sensors 52, 52*a* may open and close randomly for short periods due to ridges and other inconsistencies in the middle of the bottle. Then the third sensor 64 will close and the first and second sensors 52 and 52*a* may continue to change. As the end of the bottles travel through the chute, first and second sensors 52 and 52*a* will be open and then the third sensor 64 will open (as the flap 54 closes). Since the bottle is now past the flap, the first and second sensors 52 and 52*a* will stay open until another bottle is inserted. If the first and second sensors 52 and 52*a* are closed or close too soon after the third sensor 64 opens then either a new bottle was inserted or the customer may be trying to pull the bottle backwards to get more than 1 ticket (most likely the latter since the time period here is short). This makes it more difficult to cheat (pulling the bottle backwards) by looking for this condition within the time as set in step (d) after seeing the third sensor 64 open. The time 255 ms is preferred in this embodiment since pulling the bottle backwards must be done very quickly before the stop members 34 and 34*a* can work. A longer time could be used, but that may not provide much more security and would also mean a longer wait for the ticket. The longer time would also mean a greater chance that another bottle has been inserted. The time chosen is believed to be a good compromise.

(f) After dispensing a ticket, a second timer is set and started that disables the unit from detecting a bottle and dispensing tickets until this timer times out. This is believed to also to help discourage cheating. As noted above, a preferred time is about 1 second.

It is appreciated that described above are novel apparatuses and methods. It is also understood that this invention is not limited to bottles, but can be used with any suitable item, although changes and modifications to the configuration of the device may be required for the particular item. It is also understood that the invention is not limited to the embodiments and illustrations described above, and includes the full scope provided by the claims appended hereto.

The invention claimed is:

1. An apparatus for receiving and detecting a bottle, comprising:

a chute configured for receiving the bottle therein, said chute having a bottle inlet for receiving the bottle, a bottle outlet through which the bottle exits said chute, a chute wall extending longitudinally between said inlet and said outlet and a chute interior between said inlet and said outlet through which said bottle moves;

a bottle stop having a stop member disposed within said chute and biased in a direction away from said chute wall towards said chute interior such that said stop member engages said bottle in said chute interior when said bottle moves through said chute, said stop member configured such that said stop member is moveable by said bottle in a direction away from said bottle toward said chute wall as said bottle moves from said inlet to said outlet thereby allowing said bottle to pass, and said stop member is moveable by said bottle in accordance with said bias in a direction away from said chute wall towards said bottle as said bottle is pulled in a direction from said outlet to said inlet to more forcibly engage and thereby inhibit movement of said bottle; and a first sensor for detecting when the bottle is at a first position within said chute, said sensor being in communication with an indicator for indicating the receipt of a bottle.

2. The apparatus of claim 1 further comprising a second stop having a second stop member disposed to engage the bottle within said chute and inhibit movement of said bottle if pulled in a direction from said outlet to said inlet, said second stop member being disposed to engage said bottle along a different area of said bottle than said first stop member.

3. The apparatus of claim 2 wherein said first and second stop members are positioned to engage substantially opposite sides of said bottle within said chute thereby cooperating with one another by gripping the bottle therebetween to inhibit movement of said bottle in the direction from said outlet towards said inlet, said first and second stop members also being spaced longitudinally from one another.

4. The apparatus of claim 1 wherein said stop member is pivotally attached to said chute wall and extends towards said interior of said chute in which said bottle moves, said stop member configured to move towards said outlet and said chute wall when said bottle engages said stop member moving in the direction from said inlet towards said outlet, and said stop member configured to move away from said chute wall and away from said outlet when said bottle engages said stop member as said bottle is pulled in the direction from said outlet towards said inlet.

5. The apparatus of claim 1 further comprising a second sensor for detecting when the bottle is at a second position within said chute, the second position being spaced longitudinally from said first position between said chute inlet and said outlet so as to detect different positions of said bottle within said chute, said second sensor being in communication with said indicator.

6. The apparatus of claim 4 further comprising another sensor, said another sensor disposed to detect movement of the bottle through said outlet, said another sensor being in communication with said indicator.

7. The apparatus of claim 5 further comprising another sensor, said another sensor disposed to detect movement of the bottle through said outlet, said another sensor being in communication with said indicator.

8. The apparatus of claim 5 wherein said indicator comprises a ticket dispenser.

9. The apparatus of claim 2 wherein said indicator comprises a ticket dispenser.

10. The apparatus of claim 1 wherein said sensor is an optical sensor, and said apparatus includes a deflector member moveable in response to movement of said stop member and positioned to interfere with an optical beam of said sensor to indicate that the bottle has reached the position of said stop member.

11. The apparatus of claim 8 wherein said indicator further comprises a controller in communication with said sensor.

12. A method of receiving and detecting a bottle, comprising:

(a) providing a chute having an inlet through which the bottle is received and an outlet through which the bottle exits, said outlet being spaced longitudinally from said inlet;

(b)(1) detecting the bottle at a first position within said chute;

(b)(2) detecting the bottle at a second position within said chute, said second position being spaced longitudinally from said first position in the direction the bottle travels in the chute so as to detect the bottle in said chute at a different longitudinal length from said inlet than said first position; and (c) dispensing a receipt if a predetermined sequence of detecting the bottle at said first and second positions takes place.

13. A method in accordance with claim 12 further comprising the step of (b)(3) detecting the bottle at a third position, said third position indicating that the bottle has reached the outlet and is spaced longitudinally from said first and second positions; and wherein step (c) comprises dispensing a receipt if a predetermined sequence of detecting said first, second and third positions takes place.

14. A method in accordance with claim 12 wherein step (c) comprises said second position initially being detected while said first position is still being detected in order for a ticket to be dispensed.

15. A method in accordance with claim 12 wherein step (b)(3) comprises detecting that said bottle has moved through said outlet.

16. A method in accordance with claim 13 wherein the predetermined sequence of step (c) comprises step (b)(2) taking place after step (b)(1), and step (b)(3) taking place after step (b)(2) in order for a ticket to be dispensed.

17. An apparatus for receiving and detecting a bottle, comprising:

a chute configured for receiving the bottle therein, said chute having a bottle inlet for receiving the bottle and a bottle outlet spaced longitudinally from said inlet and through which the bottle exits said chute;

a first sensor disposed to detect the bottle at a first position within said chute;

a second sensor disposed to detect the bottle at a second position within said chute, the second position being spaced longitudinally from said first position between said chute inlet and said outlet so as to detect the bottle in said chute at a different longitudinal length from said inlet than said first position; and a receipt dispenser in data communication with said first and second sensors and configured to issue a receipt if a predetermined sequence of detecting said first and second positions takes place.

18. The apparatus of claim 17 further comprising a third sensor disposed to detect the bottle at a third position within said chute, said third position being spaced longitudinally from said first and second positions along said chute so as to detect a different position of said bottle within said chute, said receipt dispenser issuing a receipt based on the data received from said three sensors.

19. The apparatus of claim 18 wherein said third sensor is disposed to detect movement of said bottle through said outlet.

20. The apparatus of claim 17 wherein said chute includes a chute wall and a chute interior, said apparatus further comprising at least one stop member disposed within said chute and biased away from said chute wall and towards said interior so as to slidably engage said bottle moving through said chute in a direction from said inlet towards said outlet, said stop member being moveably mounted so as to be moveable against said bias in a direction away from said bottle towards said chute wall when said bottle engages said stop member as said bottle moves from said inlet to said outlet while being moveable in a direction in accordance with said bias away from said chute wall towards said bottle as said bottle engages said stop member as said bottle is pulled in a direction from said outlet to said inlet to more forcibly engage and thereby inhibit movement of said bottle.

* * * * *